United States Patent [19]

Schievelbein

[11] Patent Number: 5,033,547
[45] Date of Patent: Jul. 23, 1991

[54] METHOD FOR DECREASING MOBILITY OF DENSE CARBON DIOXIDE IN SUBTERRANEAN FORMATIONS

[75] Inventor: Vernon H. Schievelbein, Houston, Tex.

[73] Assignee: Texaco Inc., White Plains, N.Y.

[21] Appl. No.: 539,505

[22] Filed: Jun. 18, 1990

[51] Int. Cl.$^5$ .............................. E21B 43/22
[52] U.S. Cl. ............................ 166/274; 166/268; 252/8.554
[58] Field of Search ............ 166/268, 273, 274; 252/8.554

[56] References Cited

U.S. PATENT DOCUMENTS

| | | | |
|---|---|---|---|
| 3,342,256 | 9/1967 | Bernard et al. | 166/274 X |
| 4,380,266 | 4/1983 | Wellington | 166/274 X |
| 4,519,455 | 5/1985 | Holtmyer et al. | 166/308 X |
| 4,609,043 | 9/1986 | Cullick | 166/268 |
| 4,800,957 | 1/1989 | Stevens, Jr. et al. | 166/268 |
| 4,828,029 | 5/1989 | Irani | 166/268 |
| 4,856,588 | 8/1989 | Borchardt | 166/273 |

FOREIGN PATENT DOCUMENTS 823466 9/1969 Canada .............................. 166/274

*Primary Examiner*—George A. Suchfield
*Attorney, Agent, or Firm*—Jack H. Park; Kenneth R. Priem; Harold J. Delhommer

[57] ABSTRACT

Oil recovery by carbon dioxide flooding is increased by adding surfactants to the carbon dioxide at high pressures such that an emulsion with water will be formed in the pore spaces of rock. The emulsion diverts flow of carbon dioxide to rock containing higher oil saturations.

4 Claims, No Drawings

METHOD FOR DECREASING MOBILITY OF DENSE CARBON DIOXIDE IN SUBTERRANEAN FORMATIONS

FIELD OF THE INVENTION

This invention relates to an enhanced oil recovery process, whereby carbon dioxide, which is at high pressure and in a liquid or supercritical state, is injected under high pressure through wells into an oil reservoir, the improvement being provided by the addition of surfactants to the carbon dioxide. The surfactants cause formation of an emulsion with the water phase naturally present to increase the pressure drop in the volume of the rock where carbon dioxide has entered, thereby leading to a more uniform and efficient displacement of oil by the carbon dioxide.

DESCRIPTION OF RELATED ART

The use of carbon dioxide for enhancing recovery of petroleum from subterranean formations has grown steadily in recent years. Carbon dioxide is injected into one or more selected wells, usually as a "supercritical fluid," i.e., a fluid at a temperature above its critical temperature (88° F.) and critical pressure (73 atmospheres).

As the carbon dioxide contacts crude oil in the pore spaces of the reservoir rock, the carbon dioxide dissolves in the crude oil, increasing the volume of the oil and decreasing the viscosity of the oil phase. These effects cause more of the crude oil to be displaced to production wells. With some crude oils and carbon dioxide at sufficiently high pressure, the carbon dioxide becomes miscible with the oil. Under conditions of miscibility, practically all the crude oil can be displaced from rock where the carbon dioxide sweeps.

A primary limitation of carbon dioxide flooding, however, has been the high mobility of carbon dioxide, coupled with its low density, which causes the carbon dioxide to move through the oil reservoir in small channels or fingers, to move rapidly through higher permeability rock layers and to move along the top of permeable sands without producing the uniform displacement of crude oil that is desired. Large volumes of the reservoir are not contacted by the carbon dioxide under these conditions, and the amount of oil recovered is thereby decreased.

Efforts to decrease the mobility of carbon dioxide and thereby to effect a more uniform displacement of crude oil have a long history. The process of incorporating surfactants was addressed in U.S. Pat. No. 3,342,256, issued to Bernard and Holm on Sept. 19, 1967. Surfactants were described for addition to dense carbon dioxide or to a preceding liquid solvent injected before the carbon dioxide. The surfactants were selected to form a foam in reservoir rock with carbon dioxide and a subsequently injected aqueous drive fluid, thereby blocking some pores of the rock by foam, such that fluid flow was diverted to other portions of the rock. Likewise, U.S. Pat. No. 4,706,752, issued to Holm on Nov. 17, 1987, describes the formation of a foam in the reservoir to decrease mobility of fluids by injection of an aqueous solution of a surface active chemical. The formation of a foam in this disclosure depends on the presence of a non-hydrocarbon gas to form a free gas phase in the reservoir. The gas phase is the internal or discontinuous phase of a foam which blocks or impedes flow in higher permeability zones of a reservoir.

U.S. Pat. No. 4,161,982, issued to Schievelbein et al on July 24, 1979, describes the formation of a coarse emulsion for reducing mobility of water during a water flood. The described invention is limited to emulsions of water and oil which are formed by use of chemical surfactants injected in an aqueous phase. The emulsions are formed in situ when the flood water containing surfactant contacts the oil phase already present in the rock. As oil is increasingly added to the emulsion as the injected water flows away from an injection well, the emulsion becomes more viscous and more effective in diverting flow to other zones of the reservoir.

A different approach to the control of supercritical carbon dioxide mobility is disclosed in U.S. Pat. No. 4,609,043. Use of a polymer dissolved in the carbon dioxide with the aid of an "entrainer," which is a polar organic compound, is claimed.

In recent patent, U.S. Pat. No 4,828,029, the use of a co-solvents in dense carbon dioxide is disclosed for obtaining solubility of surfactants. Surfactants of the type originally disclosed by Holm are proposed, along with significant amounts of hydrocarbon or aqueous cosolvents in the carbon dioxide. The difficulties with the use of cosolvents are that adding hydrocarbons is very expensive and adding water causes, inter alia, loss of injectivity of the carbon dioxide and lower recovery efficiency of carbon dioxide.

It is well-known that flow through porous media can be restricted by having more than one fluid phase in the porous media. This flow is further restricted if interfaces of the two phases bridge the flow paths within the media. In the processes employing foams or emulsions, a dispersion of one fluid in another provides the mechanism by which mobility of the fluid being used to displace oil is decreased. Dispersions are formed with surfactants which accumulate at the interfaces between the fluids in each instance. Conventional surfactants are not soluble in carbon dioxide. Hence, it is necessary to add water or oil to the carbon dioxide to achieve solubility. A substantial need exists for a process employing a dispersion that can be formed from surfactants added directly to carbon dioxide and that can be used to divert flow from zones being flooded by carbon dioxide without the injection of an aqueous phase.

SUMMARY OF THE INVENTION

A method is provided to decrease the mobility of carbon dioxide in rock, whereby greater amounts of petroleum will be recovered from a reservoir into which carbon dioxide is injected for enhanced oil recovery. The mobility control is achieved by adding one or more certain surface active chemicals to carbon dioxide, which is either in a liquid or supercritical state, before it is injected into wells. The surface active chemicals are selected from ethoxylated alkyl and alkyl aryl hydrocarbons which contain an alkyl chain with an average of 7 to 15 carbon atoms and an average of between 1 and 7 ethoxide units per molecule, and which have been discovered to have sufficient solubility in dense carbon dioxide to cause water that is already present in the oil reservoir to emulsify with the carbon dioxide. The emulsion decreases the mobility of the injected carbon dioxide. Upon continued injection of carbon dioxide, flow is diverted to other less permeable zones of the reservoir or away from the top of the reservoir, thereby improving the vertical conformance of the carbon dioxide flood and substantially increasing the oil recovered by the flooding process. Injection of surfactant chemicals in the carbon dioxide may be terminated or interrupted after a sufficient pressure increase has been caused, while injection of carbon dioxide continues. The method does not rely on subsequent injection of water to achieve lower mobility of carbon dioxide or of mixing cosolvents with the carbon dioxide to achieve surfactant solubility.

DESCRIPTION OF PREFERRED EMBODIMENTS

Carbon dioxide is used in enhanced oil recovery operations at a variety of pressure and temperature conditions, depending on the depth of the oil reservoir being flooded and the prior production of fluids from that reservoir. It is most often used in oil reservoirs more than about 4000 ft in depth, and at this depth pressures in the range of 1500 to 2000 psi can be achieved in the reservoir. As will be shown below, the minimum pressure at which the carbon dioxide will be present in the reservoir is important in determining the ability to solubilize surfactants directly into the carbon dioxide. Reservoir pressure must be adequate to keep the surfactants in solution in the carbon dioxide as it flows through the rock at reservoir temperature.

I have discovered a class of surfactants that are sufficiently soluble and possess required properties to emulsify water that is already present in the reservoir with injected supercritical dense carbon dioxide. The solubility of surfactants in the carbon dioxide depends on pressure, structure of the hydrocarbon portion of the surfactant (the lipophilic portion) and structure of the water soluble portion (the hydrophilic portion) of the molecule. Tests which I performed with a crude oil and supercritical dense carbon dioxide showed that the lipophilic portion should preferably be an alkyl chain of about 12 to 14 carbon atoms in length, since alkyl chains up to this length were very soluble in the carbon dioxide. It was also reasoned that ethylene oxide groups could serve as the polar part of the molecule, since such surfactants are relatively inexpensive to manufacture and can provide the interfacial activity necessary at the carbon dioxide-water interface. But, the ethylene oxide portion of the molecule should not be so massive that its carbon dioxide insolubility completely overwhelms the carbon dioxide solubility that the alkane portion of the molecule has. Therefore, a relatively low level of ethoxylation compared to most commercial ethoxylate surfactants was used. I chose an alkyl alcohol with a chain length of 12 to 14 carbon atoms reacted with an average of 6.5 moles of ethylene oxide per mole of alcohol for testing. Although this is the preferred amount of ethylene oxide, a range from 4.0 to 8.0 moles of ethylene oxide would be suitable under some conditions of pressure and temperature.

The formula for the surfactants of my invention is

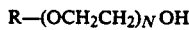

$R-(OCH_2CH_2)_N OH$ where R is an alkyl group or an alkyl aryl group wherein the alkyl chain contains 7 to 15 carbon atoms, and N is 4 to 8.

Solubilities in supercritical carbon dioxide were determined using the surfactant EP1214, which is an ethoxylated straight chain alcohol with 12 to 14 carbon atoms reacted with an average of 6.5 units of ethylene oxide per mole of alcohol, at different pressures and temperatures. The results are shown in Table 1.

TABLE 1

| Temperature | CO2 Density | CO2 Pressure | Solubility |
|---|---|---|---|
| 110° F. | | 1500 psi | 0.0 wt. % |
| | 0.68 g/cc | 1750 | 0.5 |
| | .73 | 1900 | 0.7 |
| | .81 | 2600 | 1.7 |
| | .85 | 2800 | 2.2 |
| 120 | .70 | 2100 | 0.7 |
| | .73 | 2250 | 1.3 |
| | .82 | 3000 | 2.5 |
| 168 | .58 | 2750 | 0.4 |
| | .64 | 3100 | 0.9 |
| | .70 | 3500 | 1.6 |
| | .73 | 3750 | 1.9 |

It is known in the art that concentrations of surfactants in the range between about 0.2 wt. % and 2.0 wt. % are sufficient for formation of emulsions. Therefore, when carbon dioxide pressure is greater than about 1700 psig and the temperature is 110° F. with this surfactant, sufficient amounts can be added directly to the carbon dioxide to form an emulsion in the reservoir.

Water or brine is always present in an oil reservoir, since it is present in nature before oil accumulates in a reservoir and cannot be entirely displaced by accumulation of the crude oil in the reservoir over geologic time. This water or brine is called "connate water." Even when conditions in the reservoir are such that carbon dioxide and the crude oil are miscible, in which case essentially all the crude oil will be displaced by the carbon dioxide where it flows, the connate water will be present in the pore spaces of the rock. When this water is emulsified with the carbon dioxide, viscosity of the emulsion will increase to values much greater than the viscosity of the carbon dioxide and flow will be effectively diverted to other zones of the reservoir.

The ability to form an emulsion with carbon dioxide, water and a surfactant may be determined by observations directly in a high-pressure cell containing a transparent window, in which case carbon dioxide at high pressure, the surfactant chemical or chemicals and water or brine are added to the cell, the fluids are agitated and the formation of an emulsion is observed directly. Preferably, the formation of an emulsion in the pore spaces of a porous material is determined by measuring the pressure drop as carbon dioxide and water flow through the porous material.

The concentrations of the alkyl or alkylaryl ethoxylated surfactants will ordinarily be in the range of from about 0.1 to about 4 and preferably from about 0.5 to about 2% by weight in the carbon dioxide.

The total volume of carbon dioxide containing surfactant to be injected into the reservoir when applying my invention is usually from about 0.01 to about 25 and preferably from about 0.1 to about 10% of pore volume in the productive zone between the injection well or wells and the production well or wells. The total volume may be continuously injected or it may be intermitently injected in slugs, separated by carbon dioxide not containing surfactant. (A slug is the amount of fluid to saturate the pore volume of the reservoir rock in the zone being flooded for at least a few feet, say 5 feet around an injection well, or as much as a few hundred feet.) Alternatively, the injection of the surfactant/carbon dioxide mixture can proceed until an injection pressure increase is noted, irrespective of pore volume calculations. Water or other fluids may be injected after carbon dioxide injection, but water injection is not required for the operation of my invention. Water injection will occur only after a large slug of carbon dioxide has been injected. The benefits from my invention will occur during the injection of the carbon dioxide, as the formation of an emulsion in the reservoir serves to divert flow of carbon dioxide into oil-saturated volumes of the reservoir rock, and not during or after the injection of the following water, as would be expected when formation of a foam is relied upon.

FIELD EXAMPLE

A subterranean formation at a depth of 6200 feet in West Texas has already been flooded with water, and the average oil saturation remaining in the rock is 40% of the pore volume of the rock in the volume swept by water. The pressure in the reservoir is 3000 psi and the temperature is 160° F. The formation contains strata of differing permeability. Carbon dioxide is delivered to the oil field by pipe line. The pressure in the pipe line is 1000 psi. The carbon dioxide is compressed to 3100 psi in the field. Injection of carbon dioxide is begun in several selected wells and continues for six months at a total rate of 15 million standard cubic feet per day. Breakthrough of carbon dioxide has occurred in two of the production wells nearest to Injection Well No. 1, and the production rate of carbon dioxide is increasing rapidly in these two wells. At this time, a separate high pressure pump is used at Injection Well No. 1 to begin injection of the surfactant EP1214 into the carbon dioxide line at such a rate to produce a concentration of the surfactant equal to 0.9% by weight. After one week of injection of the surfactant in the carbon dioxide, the injectivity of the carbon dioxide-surfactant mixture has decreased 20%. Carbon dioxide without surfactant is continued. At the production wells where breakthrough of carbon dioxide has occurred, the production rate of carbon dioxide has decreased by 40 to 50% and the oil production rates have increased. This result is believed to be achieved because the surfactant in the carbon dioxide has formed an emulsion with water in the formation, causing the carbon dioxide to be diverted to volumes of the reservoir which contain higher oil saturations.

Although the invention has been described in conjunction with the embodiments thereof, including a preferred embodiment, it is apparent that the invention is capable of many modifications, alternatives and variations. Accordingly, it is intended to embrace with the invention all such modifications, alternatives, and variations as may fall within the spirit and scope of the appended claims.

What I claim is:

1. A process for recovering petroleum from an underground reservoir wherein the reservoir is penetrated by at least one injection well and at least one production well, said wells being in fluid communication with each other, comprising:

injecting into at least one injection well a mixture of carbon dioxide and an emulsifying agent for forming an emulsion in the reservoir of carbon dioxide, connate water and emulsifying agent, said emulsifying agent comprising an ethoxylated alkyl or alkylaryl alcohol having from about 7 to about 15 carbon atoms in the alkyl group and an average of about 4 to about 8 ethoxylate groups per molecule;

injecting carbon dioxide into the reservoir through at least one injection well; and recovering petroleum from one or more production wells.

2. The process of claim 1 wherein the pressure of the carbon dioxide when it enters the underground reservoir is sufficient to provide solubility of the emulsifying agent in the carbon dioxide at values greater than 0.2% by weight.

3. The process of claim 1 wherein the emulsifying agent is a mixture of alkyl alcohols having an average of 12 to 14 carbon atoms per molecule reacted with an average of 6.5 moles of ethylene oxide per mole of alcohol.

4. The process of claim 1, wherein the carbon dioxide and emulsifying agent are injected into the reservoir at pressures about 1500 psi.

* * * * *